United States Patent Office 2,912,414
Patented Nov. 10, 1959

2,912,414

PROCESS FOR THE PRODUCTION OF RUBBER-LIKE POLYURETHANES

Heinz Schultheis and Wilhelm Kallert, Koln-Stammheim, and Detlef Delfs, Opladen, Germany, assignors, by mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware No Drawing. Application January 11, 1957
Serial No. 633,549

Claims priority, application Germany January 16, 1956

6 Claims. (Cl. 260—75)

This invention relates generally to the manufacture of rubber-like polyurethanes and more particularly to an improved method of carrying out the reaction between a polyisocyanate and a polyhydroxy compound.

It is known to produce rubber-like polyurethanes from polyhydroxy compounds and polyisocyanates, if necessary with the concurrent use of a chain-extender. As polyhydroxy compounds, there are usually employed linear or slightly branched polyesters, polyester amides, polyethers or polythioethers with terminal hydroxyl groups. Suitable polyisocyanate components are, for example, the toluylene diisocyanates and naphthylene-1,5-diisocyanate. As chain-extenders, there may be mentioned glycols, amino alcohols, diamines and hydrazines. In the conventional process of preparing cast polyurethane rubber, the polyhydroxy compound is mixed with the polyisocyanate at elevated temperature, if necessary with addition of a chain-extender, and the reaction mixture is poured into molds where cross-linking under the action of heat takes place. It is possible to obtain soft or hard molded elements with different mechanical properties, depending upon the nature and amount of the reactants used.

Since the reaction mixture quickly becomes highly viscous, the pouring time available is limited. This time is also subject to considerable variations even with otherwise similar mixtures, these variations apparently resulting from the method of manufacturing the initial materials. Such unexpected variations in the pouring period, which cause difficulties in the processing, become particularly apparent in cases where the casting period is in itself very short.

It has already been proposed to retard isocyanate reactions by adding to the reaction mixture certain acids, such as hydrogen chloride, sulfur dioxide and boric acid. However, in the case of cast polyurethane rubber, a considerable amount of acid would have to be added in order to product a detectable retarding effect. This amount of acid would be of such an order as to adversely affect the mechanical properties of the final plastic.

It is an object of the present invention to provide a process for the production of rubber-like polyurethanes which can easily be controlled. More specifically, it is an object of this invention to provide a process for the production of cast polyurethane rubber wherein the pouring time can be extended by the use of specific additives. Another object of the invention is to provide a process which is reproducible and results in end products of the desired properties. Further objects will appear hereinafter.

It has now been found in accordance with the present invention that in the production of rubber-like polyurethanes from polyhydroxy compounds and polyisocyanates, if necessary with concurrent use of chain-extenders, the pouring time for the reaction mixture can be extended if the reaction is carried out in the presence of a small amount of a compound with the atom grouping,

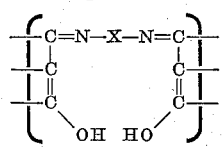

in which X represents a divalent aliphatic or cycloaliphatic radical with 2 to 6 carbon atoms.

Any compound containing the above atom grouping can be used as retarding agent in the process of the invention, illustrative examples including the condensation products from 2 mols of salicylaldehyde or o-hydroxyacetophenone with 1 mol of ethylene diamine, propylene diamine-(1,2), trimethylene diamine or tetramethylene diamine. Aliphatic compounds containing the above atom grouping can also be used, a representative example being the condensation product from 2 mols of acetyl acetone and 1 mol of ethylene diamine of the following formula:

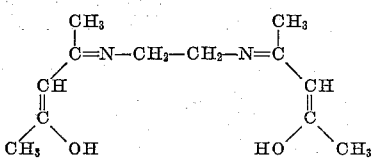

In carrying out the process of the invention, the retarding agent can be admixed with the components in any desired manner and at any desired time prior to or during the reaction. Thus, it is possible to mix the retarding agent with the polyhydroxy compound and subsequently to react the mixture with the polyisocyanate. Alternatively, the retarding agent can be added to the polyisocyanate prior to its reaction with the polyhydroxy compound. A third option is to add the retarding agent to the reactive mixture prepared from the polyhydroxy compound and the polyisocyanate immediately after the components have been brought together. If a chain-extender is used in the process of the invention, the retarding agent may be added to said chain-extender before the same is mixed with the other components. Alternatively, the retarding agent may be added to the polyhydroxy compound, the polyisocyanate or the reactive mixture prepared therefrom prior to the addition of the chain-extender. In many cases, it is advantageous for the reactive mixture containing the retarding agent to be stirred for some time at a temperature within the range of about 50° to about 150° C. before carrying out the curing operation which results in the cross-linked end product.

A comparatively small amount of the retarding agent suffices to bring about the beneficial effect on the reaction. In general, an amount ranging from about 0.0001 to about 5% by weight, based on the weight of the reaction mixture, gives optimum results although lower or higher amounts of the retarding agent may be used if desired.

The polyhydroxy compounds and the polyisocyanates suitable for use in the process of the invention are those commonly employed in the production of rubber-like polyurethanes. Thus, as polyhydroxy compounds, there may be utilized polyesters containing terminal hydroxy groups and having a molecular weight within the range of about 500 to about 5,000, polyethers containing terminal hydroxyl groups and having a molecular weight within the range of about 500 to about 10,000, and polythioethers containing terminal hydroxyl groups and having oxygen as well as sulfur bridges between alkylene radicals.

These and other polyhydroxy compounds are prepared in known manner from polyfunctional components by esterification, etherification or polymerization. Suitable components of hydroxyl polyesters are dicarboxylic acids, such as adipic acid, phthalic acid and terephthalic acid, and polyhydric alcohols, such as ethylene glycol, diethylene glycol and trimethylol propane. By thermal esterification of these components at temperatures ranging from about 100° to about 250° C., there are obtained hydroxyl polyesters of the desired molecular weight. Depending upon the molar ratio of dicarboxylic acid to polyhydric alcohol, the hydroxy polyester will have a lower or higher hydroxyl number. For the production of rubber-like polyurethanes, hydroxyl polyesters having an hydroxyl number within the range of about 30 to about 120 are particularly suitable.

The hydroxyl polyethers are generally obtained by polymerziation of alkylene oxides, such as tetrahydrofuran, by the reaction of alkylene oxides with polyhydric alcohols or by etherification of polyhydric alcohols. The hydroxyl polythioethers may be obtained by etherification of glycols with thioether glycols in the presence of acid catalysts or by other suitable reactions.

Among the polyisocyanates usually employed in the production of rubber-like polyurethanes are 1,2,4-toluylene diisocyanate, 1,2,6-toluylene diisocyanate, 1,5-naphthylene diisocyanate, p,p'-phenylene diisocyanate and p,p'-diphenyl methane diisocyanate.

As examples of chain-extenders which are suitable for use in the process of the invention, there may be mentioned water, glycols, such as ethylene glycol, 1,4-butylene glycol, triodiethylene glycol, 1,4-butinediol and quinite, tri- and higher functional alcohols, diamines, such as ethylene diamine, 1,6-hexamethylene diamine, benzidine and p-phenylene diamine, amino alcohols and hydrazines.

The conditions of reaction used in the process of the invention are those commonly employed in the production of rubber-like polyurethanes. They are described in detail in U.S. Patents 2,620,516, 2,621,166, 2,729,618 and 2,764,565, where also a more complete enumeration of suitable starting materials can be found.

In a specific embodiment of the process of the invention, the retarding agent is added to the polyhydroxy compound or the polyisocyanate, and the components are then mixed at a temperature within the range of about 80° to about 160° C., using such an amount of polyisocyanate as to provide an excess of isocyanato groups over the hydroxyl groups contained in the polyhydroxy compound. Alternatively, the components are reacted in the absence of the retarding agent to produce a reactive mixture to which the retarding agent is then added. In both cases, the reactive mixture is poured into a mold heated to a temperature of between 80° and 150° C. to bring about the formation of the cured end product. In another embodiment of the process of the invention, a chain-extender is added to the reactive mixture prepared from polyhydroxy compound and excess polyisocyanate prior to carrying out the final curing step. In this embodiment, the retarding agent is added to the polyhdroxy compound, the polyisocyanate, the chain-extender or the reactive mixture prepared from the two first-mentioned components. Then curing and shaping is effected as usual by pouring into a mold kept at a temperature within the range of about 80° to about 150° C.

The polyurethane rubbers obtainable by the process of the invention find application in the manufacture of tires, gaskets, bearings, shock-absorbing tool handles, golf balls and other articles. The properties of these products are not in any way affected by the use of the retarding agents hereinabove disclosed.

The invention is further illustrated by the following examples without being restricted thereto. Parts mentioned are parts by weight unless otherwise indicated.

*Example 1*

500 g. of a polyester obtained from adipic acid and ethylene glycol by thermal esterification and having the OH number 52 are mixed by stirring at 132° C. with 150 g. of 1,5-naphthylene diisocyanate. After 8 minutes, the temperature of the mixture does not rise any further. Now 35 g. of 1,4-butylene glycol are introduced while stirring over a period of 20 seconds. The thinly liquid mass thus obtained is poured into waxed molds which are kept at a temperature of 110° C., only 30 second being available as the pouring time. After this time, the mixture rapidly becomes thickly viscous and solidifies after a further 10 minutes in the mold to form a dry mass. After heating for another 24 hours at 110° C., there is obtained a highly elastic plastic with a Shore hardness of 94° and a high notch impact strength.

However, if 500 mg. of disalicylal ethylene diamine are added to the polyester prior to the reaction of the latter with the isocyanate, a reaction mixture is obtained which remains thinly liquid for 65 seconds after the 1,4-butylene glycol has been incorporated by stirring and which can be poured satisfactorily at any time during this period. Thereafter, the viscosity of the mass increases rapidly and a molded element can be removed from the mold after 10 minutes. After heating for 24 hours at 110° C., a plastic is obtained with exactly the same properties as those obtained when disalicylal ethylene diamine is not added.

If the disalicylal ethylene diamine is added to the 1,5-naphthylene diisocyanate prior to the reaction with the polyester, a reaction mixture is obtained after the 1,4-butylene glycol has been incorporated by stirring which remains thinly liquid for 65 seconds and can be poured satisfactorily during this period. Thereafter, the viscosity of the mass rapidly increases and a molded element can be removed from the mold after 10 minutes. After being subjected to a heat treatment as described above, a plastic is obtained which does not show any difference in its properties from the above materials.

Finally, if the disalicylal ethylene diamine is added to the 1,4-butylene glycol, the processing of the plastic mixture takes place in exactly the same manner. The time available for pouring is also 65 seconds and the mechanical properties of the molded element obtained in this manner remain unchanged.

*Example 2*

If one of the reaction components according to Example 1 was added thereto 450 mg. of diacetylacetone ethylene diamine instead of 500 mg. of disalicylal ethylene diamine, the time available for pouring purposes is 60 seconds. After the heat treatment described in Example 1, the plastic has the same properties as the plastics obtained in Example 1.

*Example 3*

If one of the reaction components according to Example 1 has added thereto 1590 mg. of bis-(o-hydroxyacetophenone)-ethylene diamine instead of 500 mg. of disalicylal ethylene diamine, the time available for pouring is 55 seconds. After the heat treatment described in Example 1, a plastic is obtained which has the properties indicated in the said example.

*Example 4*

270 g. of 1,4-phenylene diisocyanate are added at 115° C. to 1000 g. of a polyester obtained from adipic acid and ethylene glycol and having the OH number 58. After 4 minutes, the temperature of the mixture does not rise any further and 90 g. of 1,4-butylene glycol are mixed therewith within 20 seconds. The mass thus obtained remains thinly liquid only for 35 seconds and can be poured into the molds within this period. Thereafter, the viscosity increases considerably. After 12 minutes, the plastic element is removed from the mold and heated for another 36 hours at 105° C. By this means, a polyurethane rubber is obtained which has a Shore hardness of 93° C., a high degree of elasticity and good abrasion resistance.

If one of the above reaction components has added thereto 1340 mg. of disalicylal trimethylene diamine, a thinly liquid mass is obtained after 1,4-butylene glycol has been incorporated therewith, and this mass remains thinly liquid for 70 seconds and only gradually becomes viscous. After 12 minutes, the material has solidified and can be finally processed as before. The result is a material with the above properties.

*Example 5*

110 g. of 1,5-naphthylene diisocyanate are incorporated by stirring at 128° C. into 500 g. of a polyether obtained from thiodiglycol and 1,4-butylene glycol in the mol ratio of 1:1 and having an OH number of 56. 120 mg. of disalicylal tetramethylene diamine are dissolved in the thioether prior to the reaction. After 6 minutes, the temperature of the reaction mixture does not rise any further and after incorporating 24 g. of thiodiglycol by stirring for 20 seconds, the mixture is poured into waxed molds heated at 110° C. The mass remains thinly liquid for 80 seconds, whereafter the viscosity rises rapidly. After remaining in the mold for 20 minutes, the plastic element can be removed. After heating for another 24 hours at 110° C., the material shows the following mechanical properties:

| Tensile strength, kg./cm.² | Breaking elongation, percent | Ring test strength, kg. | Elasticity, percent | Shore hardness, degrees |
|---|---|---|---|---|
| 140 | 610 | 22 | 57 | 91 |

If the process is carried out without any addition of disalicylal tetramethylene diamine to the polyether, a thinly liquid mass is obtained after incorporating the thiodiglycol into the reaction mixture, but this mass can be poured only for 45 seconds. The mechanical data of the finished article are approximately the same as those described above.

*Example 6*

140 g. of toluylene diisocyanate are admixed at 100° C. with 2000 g. of a polyester produced by thermal esterification from 175.2 parts of adipic acid, 128.2 parts of diethylene glycol and 8.1 parts of trimethylol propane. The polyester also contains 50 mg. of disalicylal ethylene diamine. The mixture is stirred for 10 minutes, the temperature rising to 104° C., and then it is poured into waxed molds, the mass remaining thinly liquid for 9 minutes, then becoming gradually more viscous and solidifying within 3 hours to form a soft mass which retains its shape. The product constitutes a valuable plastic for the manufacture of printing rollers. The Shore hardness is 18°.

However, if the reaction described above is effected without any addition, the mixture of toluylene diisocyanate and polyester has already become very highly viscous during the first 10 minutes of the stirring period and can no longer be cast to form plastic elements which are free from bubbles.

Obviously many modifications and variations of the invention, as hereinbefore set forth, may be made without departing from the spirit and scope thereof and therefore only such limitations should be imposed as are indicated in the appended claims.

What is claimed is:

1. In a process for the production of cast polyurethane rubber wherein a predominately hydroxy terminated polyester obtained from adipic acid and ethylene glycol by esterification and having the hydroxyl number 58 is reacted with an excess of 1,4-phenylene diisocyanate and 1,4-butylene glycol and the reacted mixture obtained is poured into a heated mold, the improvement which comprises adding to at least one of the reactants prior to said pouring from about 0.0001 percent to about 5 percent of disalicylal ethylene diamine.

2. In a method for making a rubber-like polyurethane which comprises reacting an organic polyisocyanate with a member selected from the class consisting of a polyester having terminal hydroxyl groups and a molecular weight of from about 500 to about 5,000 prepared by esterification of a dicarboxylic acid and a polyhydric alcohol, a polyalkylene ether glycol having a molecular weight within the range of from about 500 to about 10,000 and a polythioether glycol having a molecular weight within the range of from about 500 to about 10,000, said polyester having an hydroxyl number of from about 30 to about 120 with the lower molecular weight corresponding substantially to the higher hydroxyl number, the improvement which comprises effecting the reaction in the presence of from about 0.0001 percent to about 5 percent of the reaction product of two mols of a compound selected from the group consisting of an aromatic ortho-hydroxy aldehyde, an enolizable 1,3-diketone and an aromatic ortho-hydroxy ketone with one mole of a lower alkylene primary diamine.

3. In a method for making a rubber-like polyurethane which comprises reacting an organic polyisocyanate with a member selected from the class consisting of a polyester having terminal hydroxyl groups and a molecular weight of from about 500 to about 5,000 prepared by esterification of a dicarboxylic acid and a polyhydric alcohol, a polyalkylene ether glycol having a molecular weight within the range of from about 500 to about 10,000 and a polythioether glycol having a molecular weight within the range of from about 500 to about 10,000, said polyester having an hydroxyl number of from about 30 to about 120 with the lower molecular weight corresponding substantially to the higher hydroxyl number and a chain extender selected from the group consisting of water, a polyhydric alcohol and a diamine, the improvement which comprises effecting the reaction in the presence of from about 0.0001 percent to about 5 percent of the reaction product of two mols of a compound selected frm the group consisting of an aromatic ortho-hydroxy aldehyde, an enolizable 1,3-diketone and an aromatic ortho-hydroxy ketone with one mol of a lower alkylene primary diamine.

4. In a method for making a rubber-like polyurethane which comprises reacting an organic polyisocyanate with a polyester having terminal hydroxyl groups and prepared by esterification of a dicarboxylic acid and a polyhydric alcohol and having a molecular weight within the range of from about 500 to about 5,000 and an hydroxyl number of from about 30 to about 120 with the lower molecular weight corresponding substantially to the higher hydroxyl number, the improvement which comprises effecting the reaction in the presence of from about 0.001 percent to about 5 percent of the reaction product of two mols of a compound selected from the group consisting of an aromatic ortho-hydroxy aldehyde, an aromatic ortho-hydroxy ketone and an enolizable 1,3-diketone with one mol of a lower alkylene primary diamine.

5. The process of claim 3 wherein the chain extender is a glycol.

6. The process of claim 2 wherein the said reaction product is prepared by reacting two mols of acetyl acetone with one mol of a lower alkylene primary diamine.

References Cited in the file of this patent

FOREIGN PATENTS 760,744     Great Britain _____ Nov. 7, 1956

UNITED STATES PATENT OFFICE
CERTIFICATE OF CORRECTION

Patent No. 2,912,414

November 10, 1959

Heinz Schultheis et al.

It is hereby certified that error appears in the printed specification of the above numbered patent requiring correction and that the said Letters Patent should read as corrected below.

Column 1, line 55, for "product" read -- produce --; column 6, line 45, for "frm" read -- from --; line 59, for "0.001 percent" read -- 0.0001 percent --.

Signed and sealed this 3rd day of May 1960.

(SEAL)
Attest:
KARL H. AXLINE
Attesting Officer

ROBERT C. WATSON
Commissioner of Patents